(12) United States Patent
Lee

(10) Patent No.: US 9,422,871 B2
(45) Date of Patent: Aug. 23, 2016

(54) VARIABLE INTAKE SYSTEM FOR VEHICLE, AND APPARATUS AND METHOD FOR CONTROLLING THE SAME

(71) Applicants: Hyundai Motor Company, Seoul (KR); Kia Motors Corporation, Seoul (KR)

(72) Inventor: Sang Il Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 90 days.

(21) Appl. No.: 14/446,048

(22) Filed: Jul. 29, 2014

(65) Prior Publication Data

US 2014/0331967 A1    Nov. 13, 2014

Related U.S. Application Data

(62) Division of application No. 13/536,558, filed on Jun. 28, 2012, now Pat. No. 8,826,879.

(30) Foreign Application Priority Data

Dec. 1, 2011 (KR) .......................... 10-2011-0127970

(51) Int. Cl.
*F02D 9/08* (2006.01)
*F02M 35/108* (2006.01)
(Continued)

(52) U.S. Cl.
CPC .............. *F02D 9/08* (2013.01); *F02B 27/0273* (2013.01); *F02D 9/02* (2013.01); *F02D 11/10* (2013.01); *F02D 11/105* (2013.01); *F02M 35/0205* (2013.01); *F02M 35/108* (2013.01); *F02M 35/10013* (2013.01); *F02M 35/1222* (2013.01); *F02M 35/1038* (2013.01); *Y02T 10/146* (2013.01)

(58) Field of Classification Search
CPC ............ F02M 35/108; F02M 35/1222; F02M 35/10013; F02M 35/1038; F02D 9/08; F02D 9/02; F02D 11/10; F02D 11/105; F02B 27/0273; Y02T 10/1462
USPC ................................ 123/184.21–184.61, 337
See application file for complete search history.

(56) References Cited

U.S. PATENT DOCUMENTS 4,691,677 A * 9/1987 Hotate et al. .................. 123/399
2003/0116146 A1  6/2003 Fensom et al.
(Continued)

FOREIGN PATENT DOCUMENTS

CN    201173157 Y    12/2008
CN    101413424 A    4/2009
(Continued)

*Primary Examiner* — Marguerite McMahon
(74) *Attorney, Agent, or Firm* — Morgan, Lewis & Bockius LLP

(57) ABSTRACT

An intake system mounted to a vehicle controls an opening angle of a variable flap according to an RPM of an engine, an intake pressure, and an opening angle of a variable flap to optimize performance in various operation regions by detecting engine RPM and an intake air pressure, and determining an operation region based on the RPM of the engine; applying the intake pressure to determine a target amount of air and an opening angle of a variable flap for an operation region; driving an actuator to adjust an opening angle of the variable flap to a target opening angle; and analyzing an operation position of the actuator to detect an opening angle of the variable flap, and, when the target opening angle is not followed, correcting a drive of the actuator such that an opening angle of the variable flap follows the target opening angle.

10 Claims, 7 Drawing Sheets

(51) Int. Cl.
*F02M 35/12* (2006.01)
*F02B 27/02* (2006.01)
*F02M 35/02* (2006.01)
*F02D 9/02* (2006.01)
*F02D 11/10* (2006.01)
*F02M 35/10* (2006.01)

(56) References Cited

U.S. PATENT DOCUMENTS

| | | | |
|---|---|---|---|
| 2008/0017155 A1* | 1/2008 | Park | 123/184.55 |
| 2010/0089372 A1* | 4/2010 | Bellis et al. | 123/573 |
| 2011/0023680 A1 | 2/2011 | Yang | |
| 2011/0132310 A1* | 6/2011 | Born et al. | 123/184.21 |
| 2013/0118450 A1* | 5/2013 | Lee | 123/337 |
| 2013/0139787 A1* | 6/2013 | Lee | 123/337 |

FOREIGN PATENT DOCUMENTS

| | | |
|---|---|---|
| CN | 102094735 A | 6/2011 |
| JP | 3221979 B2 | 8/2001 |
| KR | 10-2007-0061660 A | 6/2007 |
| KR | 10-2009-0008711 A | 1/2009 |
| KR | 10-2010-0002356 A | 1/2010 |
| KR | 10-2011-0052918 A | 5/2011 |

\* cited by examiner

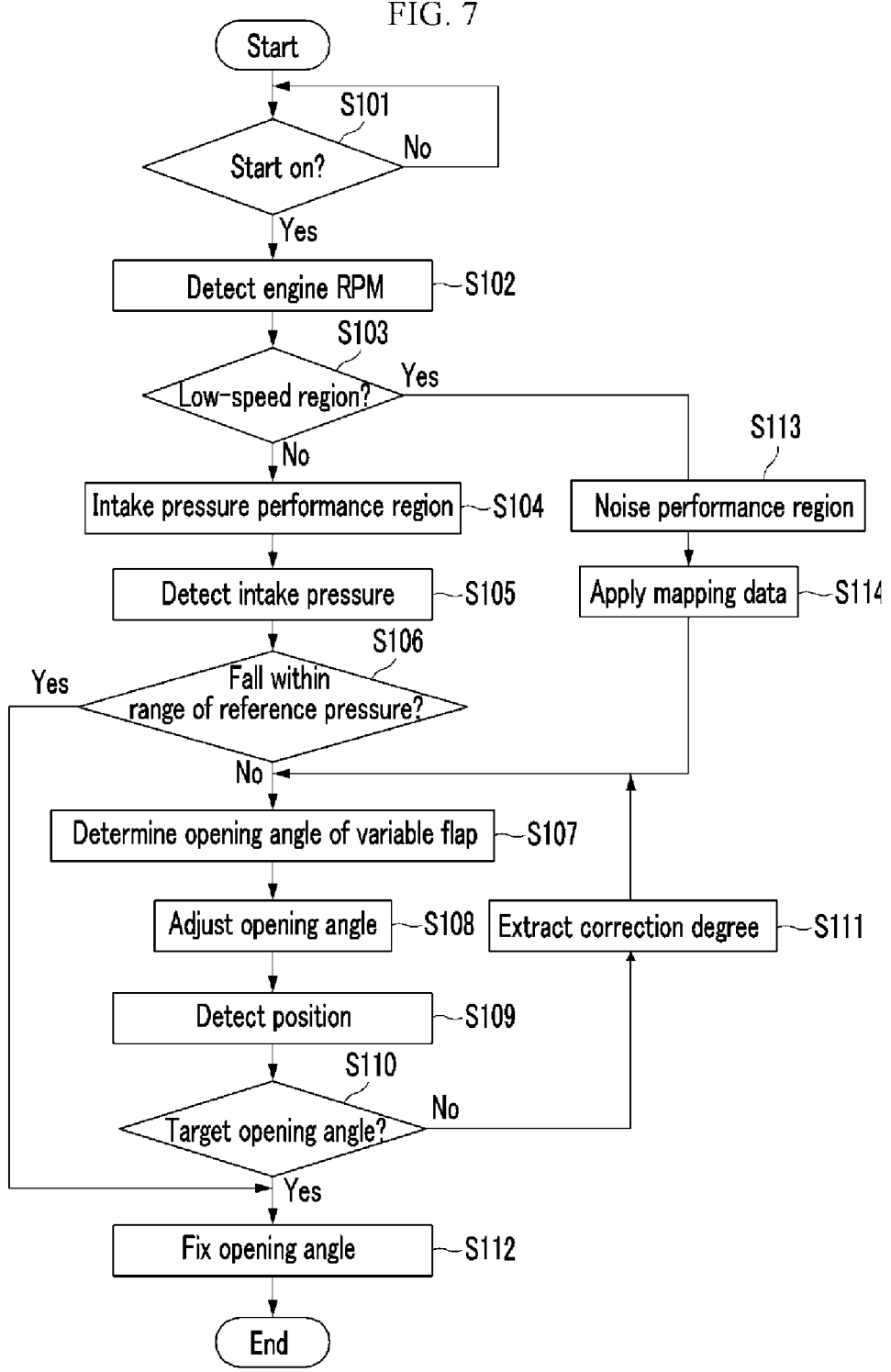

VARIABLE INTAKE SYSTEM FOR VEHICLE, AND APPARATUS AND METHOD FOR CONTROLLING THE SAME

CROSS-REFERENCE TO RELATED APPLICATION

The present application is a Divisional of U.S. patent application Ser. No. 13/536,558, filed Jun. 28, 2012, which claims priority of Korean Patent Application Number 10-2011-0127970 filed Dec. 1, 2011, the entire contents of which applications are incorporated herein for all purposes by this reference.

BACKGROUND OF INVENTION

1. Field of Invention

The present invention relates to an intake system mounted to a vehicle, and more particularly, to a variable intake system which optimally controls an angle of a variable intake valve according to an RPM of an engine, an intake pressure, and an opening angle of a variable flap to optimize performance in various operation regions, and an apparatus and a method for controlling the same.

2. Description of Related Art

A variable intake system mounted to a vehicle opens and closes an auxiliary duct according to a load of an engine to improve noise performance without causing loss of intake pressure.

A variable intake system mounted to a vehicle according to the related art has a structure where an intake duct branched to two parts is connected to an air cleaner housing, and opens one part of the intake duct if an engine is in a low speed region and opens both the two parts of the intake duct if the engine is in a high speed region.

The variable intake system includes a valve assembly for selectively opening and closing one of the two intake ducts and an actuator for supplying a driving force to the valve assembly.

The actuator may be classified into a semi-active type and an active type.

The semi-active actuator includes, for example, a vacuum type actuator using a solenoid and a naturally opened/closed actuator using a magnet, and the active actuator employs a DC motor.

However, the semi-active actuator according to the related art cannot easily adjust an opening area of an intake duct, cannot be fully opened at a maximum RPM of an engine, causing a loss of maximum output due to an increase of intake pressure, may degrade the linearity in acceleration booming, and may retard response speed, which is undesirable.

Further, while the active actuator according to the related art can be variably opened according to a mode thereof and can achieve quick response, it increases manufacturing costs, makes a power transmitting part complex, generates noise at a choking part and the like, and makes a prompt and accurate control difficult as it employs an high-priced DC motor as compared with a semi-active actuator, which is also undesirable.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention allow for promptly and accurately control a variable intake valve according to an operation region to achieve the linearity in acceleration booming, and minimize loss of an intake pressure and optimize noise reduction to improve performance of an engine.

Various aspects of the present invention provide for feedback-controlling an opening angle of a variable intake valve such that the opening angle follows a target value of an intake pressure desired for a section according to a load region of an engine in an optimum state, optimizing engine output.

Various aspects of the present invention provide for a variable intake system for regulating an amount of air introduced into a combustion chamber, the variable intake system including: an air cleaner body to which a main duct and an auxiliary duct for suctioning air are connected; a valve housing installed within the air cleaner body to be connected to the auxiliary duct; a valve assembly installed in the valve housing and configured to selectively regulate a pipe passage opening degree of the auxiliary duct; and an actuator installed in the valve housing and configured to supply a driving force to the valve assembly, wherein the actuator includes a linear motor having a motor shaft linearly moved by a current applied to a permanent magnet.

The variable intake system may further include a power transmission unit configured to connect the motor shaft of the linear motor and the valve assembly and convert a linear movement of the motor shaft to a rotation.

The valve assembly may include a valve shaft rotatably installed in the valve housing; and a flap member installed in the valve shaft and configured to selectively open and close a pipe passage of the valve housing.

The linear motor may include a motor housing installed such that the motor shaft protrudes to the outside therefrom; a permanent magnet installed within the motor housing and on which a coil is wound, the permanent magnet being installed such that the motor shaft is linearly moved through a guide member; a variable resistor contacting an electrode spirally formed within the motor housing and configured to detect a movement distance of the electrode as the guide member is linearly moved; and a support plate fixed to the motor shaft and configured to support a linear movement of the motor shaft within the motor housing.

Various aspects of the present invention provide for an apparatus for controlling a variable intake system including: a variable flap an opening angle of which is adjusted according to an operation region of an engine and configured to regulate an amount of air introduced into the engine; an engine RPM detecting unit configured to detect an RPM of the engine in a start-on state; a pressure detecting unit configured to detect an intake pressure of air introduced into an engine; a memory unit configured to store a target value of an intake pressure for an operation region of the engine and an opening degree of the variable flap as map data; a control unit configured to analyze an RPM of the engine to determine an operation region, and to apply the map data set in the memory unit and determine a target amount of air for the operation region and an opening angle of the variable flap according to the target amount of air to adjust an opening angle of the variable flap; an actuator driven according to a current control signal applied by the control unit and configured to adjust an opening angle of the variable flap; and a position detecting unit configured to detect an operation position of the actuator to provide the detected operation position to the control unit as feedback information.

If the operation region of the engine is a low-speed/low-load condition, the control unit may determine that the operation region of the engine is a noise performance region, and applies the map data set to reduce intake booming and determines a target amount of air and an opening angle of the variable flap according to the target amount of air to adjust an opening angle of the variable flap.

The control unit may detect a stroke of the actuator and an opening angle of the variable flap based on the information of the position detecting unit in a state where intake booming is reduced by adjusting an opening angle of the variable flap, to correct a drive of the actuator such that the opening angle of the variable flap follows a target opening angle.

If the operation region of the engine is a middle/high speed condition, the control unit may determine that the operation region of the engine is an intake pressure performance region, and apply the map data set in the memory unit and determines a target amount of air for improving intake pressure performance and an opening angle of the variable flap according to the target amount of air to adjust an opening angle of the variable flap.

The control unit may apply an intake pressure detected by a pressure sensor and an RPM of the engine in the middle/high-speed operation region as a real time feedback condition and determine a target amount of air and an opening degree of the variable flap according to the target amount of air such that the opening degree of the variable flap follows an amount of intake air according to the operation region.

The control unit may detect a stroke of the actuator and an opening angle of the variable flap based on the information of the position detecting unit in a state where an opening angle of the variable flap is adjusted by applying an intake pressure and an RPM of the engine as a real time condition in a middle/high-speed condition, to correct a drive of the actuator such that the opening angle of the variable flap follows a target opening angle.

Various aspects of the present invention provide for a method of controlling a variable intake system, the method including: detecting an RPM of an engine and an intake pressure of air introduced into a combustion engine, and determining an operation region based on the RPM of the engine; applying the intake pressure to determine a target amount of air and an opening angle of a variable flap for an operation region; driving an actuator to adjust an opening angle of the variable flap to a target opening angle; and analyzing an operation position of the actuator to detect an opening angle of the variable flap, and, when the target opening angle is not followed, correcting a drive of the actuator such that an opening angle of the variable flap follows the target opening angle.

The target amount of air for an operation region and the opening angle of the variable flap may be determined by applying the operation region and the intake pressure determined based on the RPM of the engine as real time feedback information.

The method may further include: if the operation region is a low-speed/low-load condition, applying map data set to reduce intake booming to determine a target amount of air and an opening angle of the variable flap, and adjusting an opening angle of the variable flap through an operation of the actuator.

The method may further include: if the operation region is a middle/high-speed region, applying map data set for an operation region and an intake pressure for improvement of intake pressure performance to determine a target amount of air and an opening angle of the variable flap, and adjusting a target opening angle of the variable flap through an operation of the actuator.

Various aspects of the present invention provide for a method of controlling a variable intake system, the method including: detecting an RPM of an engine and an intake pressure of air introduced into a combustion chamber, and determining an operation region based on the RPM of the engine; if the operation region is a low-speed/low-load condition, applying map data set to reduce intake booming to determine a target amount of air and an opening degree of the variable flap, and driving an actuator to adjust an opening angle of the variable flap; if the operation region is a middle/high-speed region, applying map data set for an operation region and an intake pressure for improvement of intake pressure performance to determine a target amount of air and an opening angle of the variable flap, and driving the actuator to adjust a target opening angle of the variable flap; and analyzing an operation position of the actuator to detect an opening angle of the variable flap, and, when the target opening angle is not followed, correcting a drive of the actuator such that an opening angle of the variable flap follows the target opening angle.

A target amount of air for an operation region and an opening angle of the variable flap may be determined by applying an operation region determined based on the RPM of the engine and an intake pressure of air introduced into the engine in real time as feedback information.

As described above, since the present invention may employ a linear motor such as a voice-coil motor as an actuator for operating a variable valve assembly, it is possible to provide the linearity in acceleration booming as compared with an existing semi-active type, minimize a loss of intake pressure, and optimize reduction of noise, improving output performance of an engine.

Further, the present invention may decrease manufacturing costs and reduce noise as compared with an existing active type, and feedback-control an opening angle of a variable valve to promptly and accurately follow a target value of an intake pressure in an engine region, achieving an optimum engine performance.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a flowchart schematically showing a procedure for controlling an exemplary variable intake system according to the present invention.

DETAILED DESCRIPTION

Figure 1:
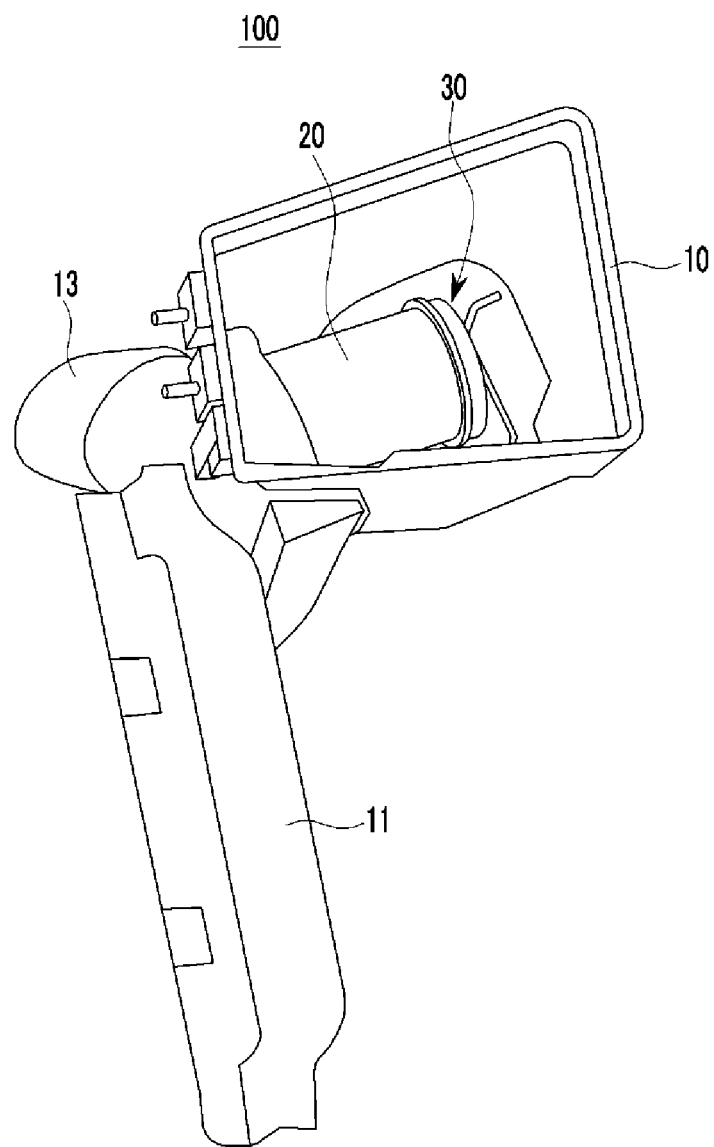
FIG. 1 is a view schematically showing an exemplary variable intake system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings and description are to be regarded as illustrative in nature and not restrictive. Like reference numerals designate like elements throughout the specification.

The configurations shown in the drawings are arbitrarily given for convenience of the description, and the present invention is not necessarily limited to the drawings.

FIG. 1 is a view schematically showing a variable intake system according to various embodiments of the present invention.

Referring to FIG. 1, the variable intake system 100 according to various embodiments of the present invention may be applied to an intake system of an engine for supplying air into combustion chambers of the engine.

The variable intake system 100 is provided in an air cleaner for filtering air supplied into combustion chambers, and is adapted to variable regulate amounts of air supplied into the combustion chambers according to an operation region of the engine.

For example, the variable intake system 100 includes two ducts installed in an air cleaner to suction air to, if an operation region of an engine is a low-speed section, supply air into a combustion chamber through one duct, and if the operation region of the engine is a middle/high-speed section, supply air into combustion chambers through two ducts to compensate for the lack of the intake air.

Figure 2:
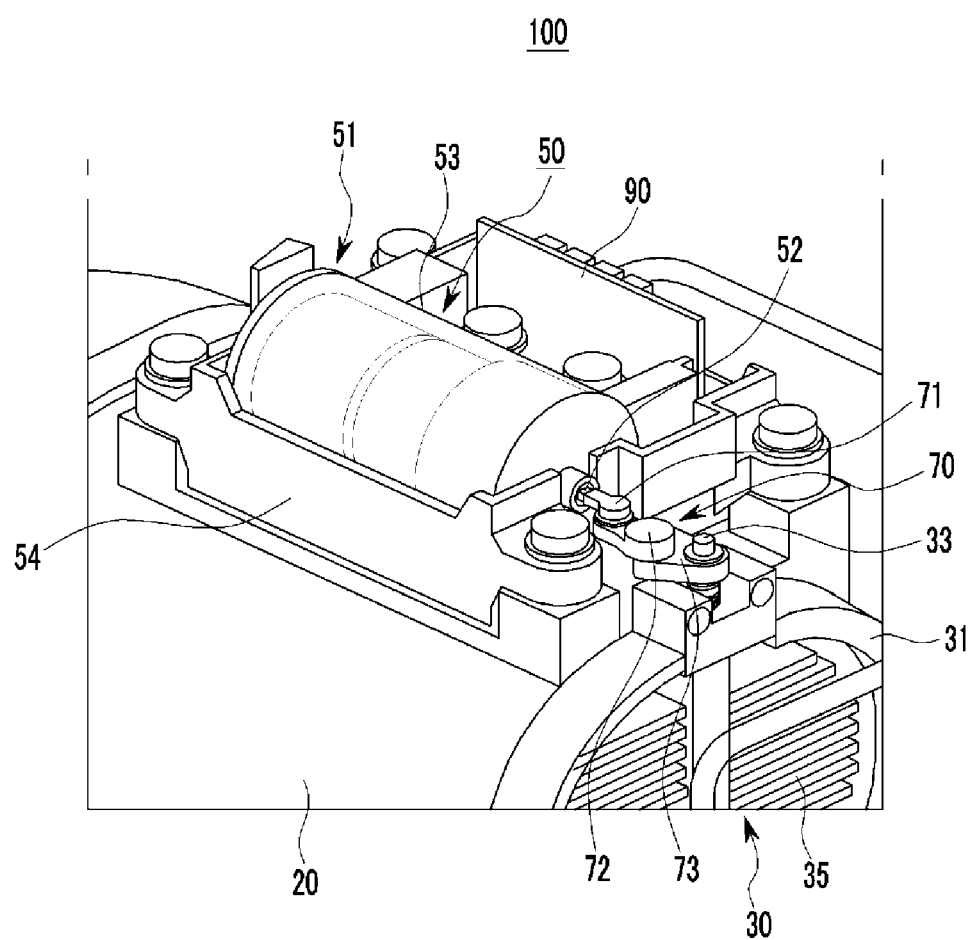
FIG. 2 is a perspective view showing a part of an exemplary variable intake system according to the present invention.
Figure 3:
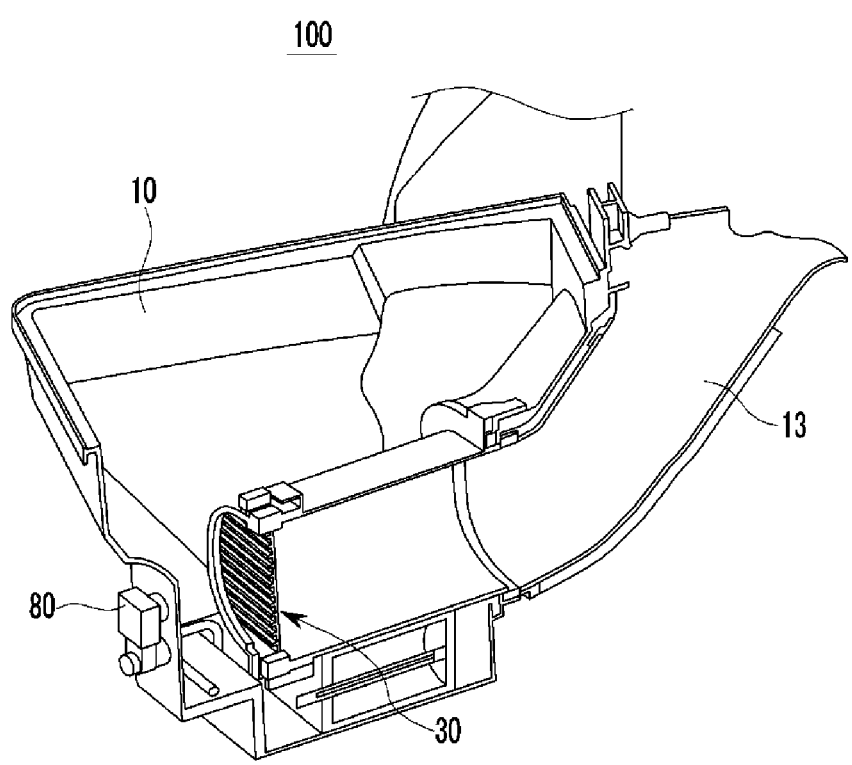
FIGS. 3 and 4 are partially cutaway perspective views showing another part of an exemplary variable intake system according to the present invention.
Figure 4:
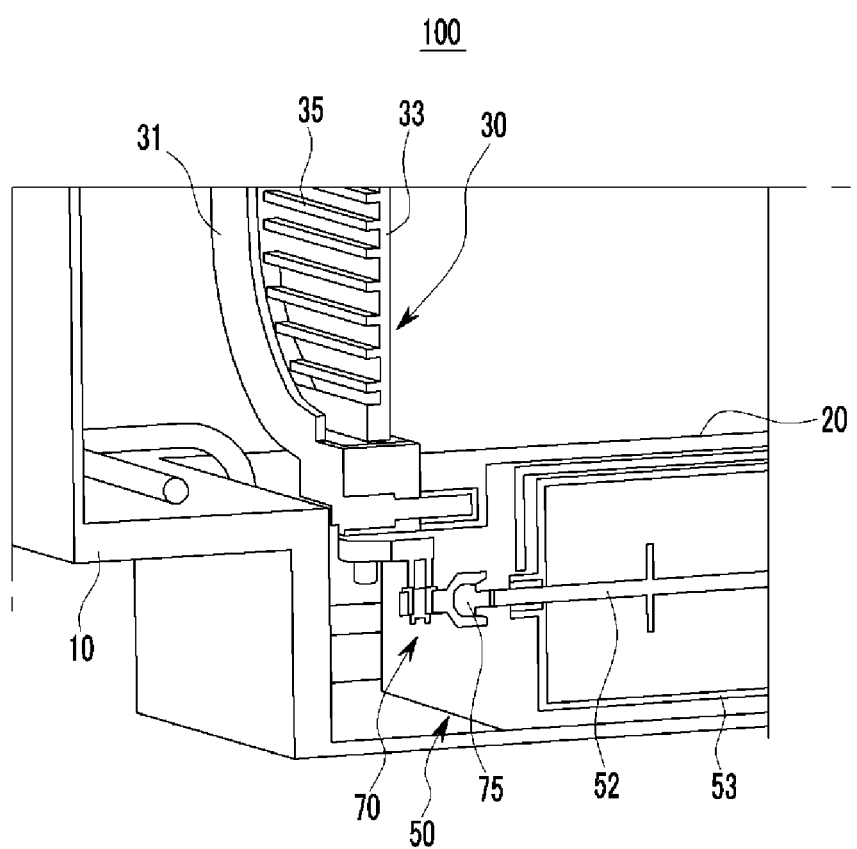
Figures 5A, 5B:
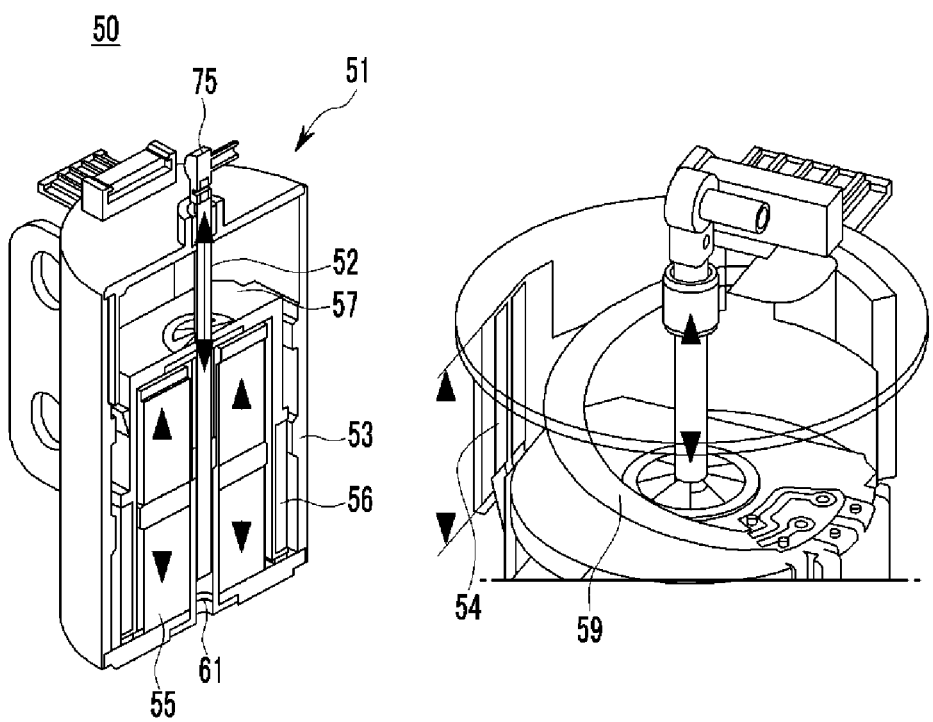
FIGS. 5A and 5B are partially cutaway perspective views showing an actuator applied to an exemplary variable intake system according to the present invention.

The variable intake system 100 for a vehicle according to various embodiments of the present invention can achieve the linearity in acceleration booming and optimize intake pressure and reduction of noise to improve output performance of an engine as compared with an existing semi-active type, and can decrease manufacturing costs, reduce noise, and realize a prompt and accurate control as compared with an existing active type FIG. 2 is a perspective view showing a part of the variable intake system according to various embodiments of the present invention. FIGS. 3 and 4 are partially cutaway perspective views showing another part of the variable intake system for a vehicle according to various embodiments of the present invention. FIG. 5 is a partially cutaway perspective view showing an actuator applied to the variable intake system according to various embodiments of the present invention.

Referring to FIGS. 1 to 5, the variable intake system 100 basically includes an air cleaner body 10, a valve housing 20, a valve assembly 30, an actuator 50, a power transmission unit 70, an intake pressure sensor 80 and a controller 90.

In various embodiments of the present invention, the air cleaner body 10 is adapted to filter air (intake air) supplied into combustion chambers of an engine, and includes a filter element for filtering foreign substances in the air.

Two intake parts into which intake air is introduced are formed in the air cleaner body 10, and a main duct 11 and an auxiliary duct 13 for suctioning air are installed in each of the intake parts.

The main duct 11 is adapted to supply intake air into a combustion chamber when an operation region of the engine is a low speed, and the auxiliary duct 13 is adapted to supply the intake air into the combustion chamber together with the main duct 11 when the operation region of the engine is a middle/high-speed or higher.

The air cleaner body 10 includes a discharge part for discharging air suctioned through the main duct 11 and the auxiliary duct 13 into the combustion chamber.

The air cleaner body 10 is an air cleaner well known in the art, and a detailed description of the configuration thereof will be omitted in the specification.

In various embodiments of the present invention, the valve housing 20 is adapted to mount the valve assembly 30 and the actuator 50 which will be described in more detail hereinbelow, and is installed within the air cleaner body 10 to be connected to an end of the auxiliary duct 13 through a flange.

The valve housing 20 includes a pipe passage connected to the auxiliary duct 13, and may be fixedly installed within the air cleaner body 10.

In various embodiments of the present invention, the valve assembly 30 is adapted to selectively regulate an opening degree of a pipe passage of the auxiliary duct 13 communicated with the valve housing 20.

The valve assembly 30 is installed at a free end of the valve housing 20, and includes a valve frame 31, a valve shaft 33 and a flap member 35.

The valve frame 31 has a circular ring shape, and is fixedly installed at a free end of the valve housing 20.

The valve shaft 33 crosses an interior center direction of the valve housing 20 and is rotatably installed in the valve housing 31, and may be rotatably installed in the valve frame 31 through a bush, a bush guide and the like.

Here, the valve shaft 33 is disposed to pass through the valve frame 31 and protrude to the outside of the free end of the valve housing 20.

The flap member 35 acts as a valve body for substantially opening and closing a pipe passage of the valve housing 20, and is fixedly installed in the valve shaft 33 in a plate shape corresponding to the pipe passage of the valve housing 20.

In various embodiments of the present invention, the actuator 50 is adapted to supply a driving force (rotating force) to the valve shaft 33 of the valve assembly 30, and is fixedly installed on an outer surface of the valve housing 20.

The actuator 50 may be, for example, a linear motor 51 such as a voice coil motor.

In various embodiments of the present invention, the linear motor 51 uses Fleming's left hand rule, and includes a motor shaft 52 linearly moved forward and rearward by a current applied to a permanent magnet.

In detail, as shown in FIG. 4, the linear motor 51 includes a motor shaft 52, a motor housing 53, a variable resistor 54, a permanent magnet 55, a coil 56, a support plate 57 and an electrode 59.

The motor housing 53 is fixedly mounted to an outer surface of the valve housing 20 through a mounting bracket 54, and the above-mentioned motor shaft 52 is installed to protrude to one side.

The permanent magnet 55 is installed within the motor housing 53, and a coil 56 is wound on the permanent magnet 55 and the motor shaft 52 is installed to be linearly moved through the guide member 61.

Thus, in the linear motor 51, if a current is applied to the coil 56 situated in a magnetic field of the permanent magnet 55, the motor shaft 52 is linearly moved through the guide member 61 in proportion to the current.

Then, the variable resistor 54 installed within the motor housing 53 contacts a spirally formed electrode 59 to detect a movement distance according to a linear movement of the guide member 61 and calculate a stroke and an opening angle of the valve according to the position of the guide member 61.

The support plate 57 is fixed to the motor shaft 52, and supports a linear movement of the motor shaft 52 within the motor housing 53.

A resilient member is mounted between an inner wall of the motor housing 53 and the support plate 57 to provide a resilient force to the support plate 57.

That is, if a current is applied to the coil 56 and the current is interrupted while the motor shaft 52 is linearly moved, the motor shaft 52 may return to an original position due to a resilient returning force of the resilient member acting on the support plate 57.

In various embodiments of the present invention, the power transmission unit 70 connects the motor shaft 52 of the linear motor 51 and the valve shaft 33 of the valve assembly 30, and functions to convert a linear movement of the motor shaft 52 to a rotation.

In various embodiments of the present invention, the controller 90 (see FIG. 2) controls an overall operation of the system, and controls the linear motor 51 of the actuator 50 according to an operation region of the engine to adjust an amount of introduced air.

If an operation region of the engine is a low speed, the controller 90 applies the set map data to operate the valve assembly 30 through the linear motor 51 while regulating an opening degree of the auxiliary duct 13 where noise reduction is optimized.

If an operation region of the engine is a middle/high speed, the controller 90 operates the valve assembly 30 through the linear motor 51 to regulate an opening degree of the auxiliary duct 13 where intake pressure performance is optimized.

That is, the control unit 90 calculates an opening degree of the auxiliary duct 13 according to a condition for an operation region of the engine, and applies a current corresponding to an opening degree of the auxiliary duct 13 to the linear motor 51 to drive the valve assembly 30 through an operation of the linear motor 51 to regulate an opening degree of the auxiliary duct 13

The controller 90 detects an intake pressure for each operation region to calculate a target amount of air for reduction of noise or improvement of intake pressure performance, and regulates an opening degree of the valve assembly 30 so that the opening degree follows the target amount of air.

After detecting an opening angle of the valve assembly 30 in a state where a target amount of air is followed by regulating an opening degree of the valve assembly 30, the controller 90 may correct the opening angle of the valve assembly 30 such that the opening angle follows the target amount of air, and accordingly, optimize noise reduction and improve performance of intake pressure.

Hereinafter, an operation 100 of the variable intake system 100 according to various embodiments of the present invention which is configured as described above will be described in detail with reference to the above-disclosed drawings.

First, in various embodiments of the present invention, if an operation region of the engine is detected to be a low speed, air is suctioned through the main duct 11 and is supplied into a combustion chamber of the engine.

Then, after applying the set map data to determine an amount of air for a current operation region, the controller 90 controls the linear motor 51 of the actuator 50 to adjust an opening angle of the variable flap.

Thus, in various embodiments of the present invention, when an operation region of the engine is a low-speed condition, air suctioned through the main duct 11 is supplied into a combustion chamber of the engine, whereby intake noise can be reduced and a resonator separately installed to reduce intake noise may be removed.

Meanwhile, If an operation region of the engine according to various embodiments of the present invention is detected to be a middle/high speed, the controller 90 calculates an opening degree of the auxiliary duct 13 according to an operation region of the engine, and applies a current corresponding to the opening degree of the auxiliary duct 13 to the coil 56 of the linear motor 51.

Then, in the linear motor 51, a current is applied to the coil 56 situated in a magnetic field of the permanent magnet 55, and the motor shaft 52 is linearly moved through the guide member 61 in proportion to the current.

That is, the motor shaft 52 of the linear motor 51 is moved forward to the outside of the motor housing 53 by Fleming's left hand rule and presses the resilient member 59 while being moved together with the support plate 57.

Accordingly, in various embodiments of the present invention, as the motor shaft 52 is moved forward in the above-described way, the valve shaft 33 is rotated by a linkage operation of first to third link members 71, 72 and 73 of the power transmission unit 70.

Then, the valve shaft 33 is rotated, the flap member 35 opens a pipe passage of the valve housing 20 communicated with the auxiliary duct 13.

Thus, in various embodiments of the present invention, when an operation region of the engine is a middle/high speed, intake air can be supplied into combustion chambers of the engine through the main duct 11 and the auxiliary duct 13.

Further, a state of an intake pressure is detected by a pressure sensor, and a target amount of air and an opening angle of the flap member 35 are determined such that intake pressure performance is introduced in an optimum condition, allowing an optimum amount of air to be suctioned.

In addition, by detecting an opening angle of the flap member 35 through the contact resistor 54 and following a target opening angle determined to follow a target amount of air, stability and reliability can be provided in control of an amount of intake air.

Accordingly, in various embodiments of the present invention, when an operation region of the engine is a middle/high speed, air can be suctioned through the main duct 11 and the auxiliary duct 13 to be supplied into combustion chambers, making it possible to further improve the output of the engine.

In this state, if an operation region of the engine is converted into a low-speed section, the controller 90 interrupts a current applied to the linear motor 51.

Then, the motor shaft 52 of the linear motor 51 returns to an original position due to a resilient returning force of the resilient member acting on the support plate 57, and accordingly, as the valve shaft 33 of the valve assembly 30 is rotated by the power transmission unit 70, a pipe passage of the valve housing 20 can be closed by the flap member 35.

As described until now, according to the variable intake system 100 for a vehicle according to various embodiments of the present invention, since the linear motor 51 such as a voice coil motor is used as the actuator 50 for operating the valve assembly 30, engine output can be improved by achieving linearity in acceleration booming and optimizing intake pressure and noise reduction as compared with an existing semi-active type, and it is possible to reduce manufacturing costs, remove noise, and realize a prompt and accurate control as compared with an existing active type.

Figure 6:
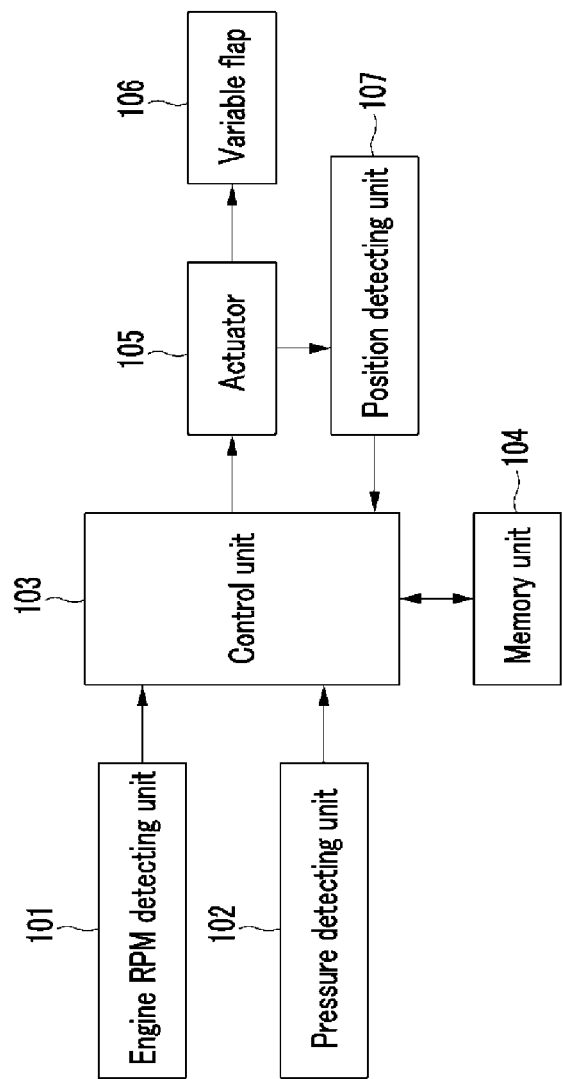
FIG. 6 is a view schematically showing an apparatus for controlling an exemplary variable intake system according to the present invention.

FIG. 6 is a view schematically showing an apparatus for controlling a variable intake system according to various embodiments of the present invention.

Referring to FIG. 6, the apparatus according to various embodiments of the present invention includes an engine RPM detecting unit 101 and a pressure detecting unit 102, a control unit 103, a memory unit 104, an actuator 105, a variable flap 106 and a position detecting unit 107.

If the engine is started on, the engine RPM detecting unit 101 detects an RPM of the engine to provide the information regarding the RPM of the engine to the control unit 103 in the form of an electric signal.

The pressure detecting unit 102 is applied as a mass air flow (MAF) sensor, and detects an intake pressure of air introduced into a combustion chamber according to an operation of the variable flap 106 to provide the information regarding the intake pressure to the control unit 103.

The control unit 103 analyzes the engine RPM provided by the engine RPM detecting unit 101 to determine an operation region, and, if the operation region of the engine is determined to be a low-speed/low-load condition, applies the map data set to reduce intake booming noise to determine a target opening angle of the variable flap 106.

If the operation region determined by analyzing an RPM of the engine is determined to be a middle/high speed or higher, the control unit 103 applies the set map data to determine a target intake pressure performance and a target opening angle of the variable flap 106.

The control unit 103 opens the variable flap 106 through driving of the actuator 104 to allow a larger amount of air to be suctioned into the engine in a middle/high-speed operation region, improving output performance of the engine, and feedback-controls an opening angle of the variable flap 106 in real time according to an RPM of the engine provided by the engine RPM detecting unit 101 such that the opening angle of the variable flap 106 follows intake pressure performance and an intake pressure provided by the pressure detecting unit 102 to regulate an amount of suctioned air.

The control unit 103 detects a stroke and an opening angle of the variable flap 106 based on an operation position of the actuator 105 provided by the position detecting unit 107 to correct a drive of the actuator 105 such that the opening angle of the variable flap 106 follows the target opening angle.

In the memory unit 104, a target value of an intake pressure for an operation region of the engine and an opening angle of the variable flap are set as map data.

The actuator 105 is driven by a current control signal applied by the control unit 103 to adjust an opening angle of the variable flap 106.

The position detecting unit 107 detects an operation position of the actuator 105 to provide the information regarding the operation position to the control unit 103 as feedback information.

An operation of the present invention including the above-described function is performed in the following way.

If the engine of the vehicle to which the variable intake system control apparatus according to various embodiments of the present invention is started on (S101), the engine RPM detecting unit 101 detects an RPM of the engine to provide the information regarding the RPM of the engine to the control unit in the form of an electric signal (S102).

Then, the control unit 103 analyzes the RPM of the engine to determine an operation region of the engine, and determines whether or not the operation region of the engine is operated in a low-speed/low-load condition (S103).

If the operation region of the engine is determined to be a low-speed/low-load condition in S103, the control unit 103 determines an operation in a noise performance region (S113), applies the map data set in the memory unit 104 to reduce intake booming noise to determine a target amount of air of the operation region (S114), and determines an opening angle of the variable flap 106 according to the target amount of air (S107).

The control unit 103 regulates an opening angle of the variable flap 106 to a target opening angle through drive of the actuator 105 to minimize intake booming and reduce noise in the low-speed operation region (S108).

While the variable flap 106 remains opened, the control unit 103 detects an operation position of the actuator 105 from the position detecting unit 107 (S109).

The control unit 103 analyzes a stroke and an opening angle of the variable flap 106 based on an operation position of the actuator 105 to determine whether or not the opening angle of the variable flap 106 follows a target opening angle (S110).

If the opening angle of the variable flap 106 fails to follow the target opening angle in S110, the control unit 103 extracts a correction degree to correct a drive of the actuator 105 such that the opening angle of the variable flap 106 follows the target opening angle (S110).

If it is determined that the opening angle of the variable flap 106 follows the target opening angle in S110, the control unit 103 fixes a position of the actuator 105 to fix an opening angle of the variable flap 106, achieving the linearity in acceleration booming and improving noise reducing performance in a condition where the operation region of the engine is a low speed (S112).

However, if it is determined that the operation region of the engine is a middle/high-speed condition in S103, the control unit 103 determines an operation region for improving intake pressure performance rather than reducing intake booming noise (S104).

Thereafter, the control unit 103 detects a pressure (intake pressure) of air suctioned into a combustion chamber from the information of the pressure detecting unit 102 (S105), and determines whether or not the intake pressure falls within a set range of reference pressure (S106).

If the intake pressure does not fall within the set range of reference pressure in 106, the control unit 103 applies the map data set in the memory unit 104 for improvement of the intake pressure performance to determine a target amount of air for a current operation region and determine an opening angle of the variable flap 106 according to the target amount of air (S107).

The control unit 103 regulates an opening angle of the variable flap 106 to a target opening angle through drive of the actuator 105 to introduce a larger amount of air into a combustion chamber in the middle/high-speed operation region (S108).

While regulating the opening angle of the variable flap 106 in the above-described way, the control unit 103 detects an operation position of the actuator 105 from the position detecting unit 107 (S109).

The control unit 103 analyzes a stroke and an opening angle of the variable flap 106 based on an operation position of the actuator 105 to determine whether or not the opening angle of the variable flap 106 follows the target opening angle (S110).

If the opening angle of the variable flap 106 fails to follow the target opening angle in S110, the control unit 103 extracts a correction degree to correct a drive of the actuator 105 such that the opening angle of the variable flap 106 follows the target opening angle (S111).

If it is determined that the opening angle of the variable flap 106 follows the target opening angle in S110, the control unit 103 fixes a position of the actuator 105 to fix an opening angle of the variable flap 106, introducing a larger amount of air into a combustion chamber and improving intake pressure performance in a condition where the operation region of the engine is a middle/high speed (S112).

For convenience in explanation and accurate definition in the appended claims, the terms rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling a variable intake system, the apparatus comprising:
    a variable flap having an opening angle adjusted according to an operation region of an engine and to regulate an amount of air introduced into the engine;
    an engine RPM detecting unit configured to detect an RPM of the engine in a start-on state;
    a pressure detecting unit configured to detect an intake pressure of air introduced into an engine;
    a memory unit configured to store a target value of an intake pressure for an operation region of the engine and an opening degree of the variable flap as map data;
    a control unit configured to analyze an RPM of the engine to determine an operation region, and to apply the map data set in the memory unit and determine a target amount of air for the operation region and an opening angle of the variable flap according to the target amount of air to adjust an opening angle of the variable flap;
    an actuator driven according to a current control signal applied by the control unit and configured to adjust an opening angle of the variable flap; and
    a position detecting unit configured to detect an operation position of the actuator to provide the detected operation position to the control unit as feedback information,
    wherein when the operation region of the engine is a low-speed/low-load condition, the control unit determines that the operation region of the engine is a noise performance region, and applies the map data set to reduce intake booming and determines a target amount of air and an opening angle of the variable flap according to the target amount of air to adjust an opening angle of the variable flap.

2. The apparatus of claim 1, wherein:
    the control unit detects a stroke of the actuator and an opening angle of the variable flap based on the information of the position detecting unit in a state where intake booming is reduced by adjusting an opening angle of the variable flap, to correct a drive of the actuator such that the opening angle of the variable flap follows a target opening angle.

3. The apparatus of claim 1, wherein:
    when the operation region of the engine is a middle/high speed condition, the control unit determines that the operation region of the engine is an intake pressure performance region, and applies the map data set in the memory unit and determines a target amount of air for improving intake pressure performance and an opening angle of the variable flap according to the target amount of air to adjust an opening angle of the variable flap.

4. The apparatus of claim 3, wherein:
    the control unit applies an intake pressure detected by a pressure sensor and an RPM of the engine in the middle/high-speed operation region as a real time feedback condition and determines a target amount of air and an opening degree of the variable flap according to the target amount of air such that the opening degree of the variable flap follows an amount of intake air according to the operation region.

5. The apparatus of claim 3, wherein:
    the control unit detects a stroke of the actuator and an opening angle of the variable flap based on the information of the position detecting unit in a state where an opening angle of the variable flap is adjusted by applying an intake pressure and an RPM of the engine as a real time condition in a middle/high-speed condition, to correct a drive of the actuator such that the opening angle of the variable flap follows a target opening angle.

6. A method of controlling a variable intake system, the method comprising:
    detecting an RPM of an engine and an intake pressure of air introduced into a combustion engine, and determining an operation region based on the RPM of the engine;
    applying the intake pressure to determine a target amount of air and an opening angle of a variable flap for an operation region;
    driving an actuator to adjust an opening angle of the variable flap to a target opening angle;
    analyzing an operation position of the actuator to detect an opening angle of the variable flap, and, when the target opening angle is not followed, correcting a drive of the actuator such that an opening angle of the variable flap follows the target opening angle; and
    when the operation region is a low-speed/low-load condition, applying map data set to reduce intake booming to determine a target amount of air and an opening angle of the variable flap, and adjusting an opening angle of the variable flap through an operation of the actuator.

7. The method of claim 6, wherein:
    the target amount of air for an operation region and the opening angle of the variable flap are determined by applying the operation region and the intake pressure determined based on the RPM of the engine as real time feedback information.

8. The method of claim 6, further comprising:
    when the operation region is a middle/high-speed region, applying map data set for an operation region and an intake pressure for improvement of intake pressure performance to determine a target amount of air and an opening angle of the variable flap, and adjusting a target opening angle of the variable flap through an operation of the actuator.

9. A method of controlling a variable intake system, the method comprising:
    detecting an RPM of an engine and an intake pressure of air introduced into a combustion chamber, and determining an operation region based on the RPM of the engine;
    when the operation region is a low-speed/low-load condition, applying map data set to reduce intake booming to determine a target amount of air and an opening degree of the variable flap, and driving an actuator to adjust an opening angle of the variable flap;
    when the operation region is a middle/high-speed region, applying map data set for an operation region and an intake pressure for improvement of intake pressure performance to determine a target amount of air and an opening angle of the variable flap, and driving the actuator to adjust a target opening angle of the variable flap; and analyzing an operation position of the actuator to detect an opening angle of the variable flap, and, when the target opening angle is not followed, correcting a drive of the actuator such that an opening angle of the variable flap follows the target opening angle.

10. The method of claim 9, wherein:
a target amount of air for an operation region and an opening angle of the variable flap are determined by applying an operation region determined based on the RPM of the engine and an intake pressure of air introduced into the engine in real time as feedback information.

* * * * *